(12) United States Patent
Yadlin et al.

(10) Patent No.: US 11,632,244 B2
(45) Date of Patent: Apr. 18, 2023

(54) TECHNIQUES FOR SINGLE ROUND MULTI-PARTY COMPUTATION FOR DIGITAL SIGNATURES

(71) Applicant: PAYPAL, INC., San Jose, CA (US)

(72) Inventors: Dan Yadlin, Tel-Aviv (IL); Ben Riva, Givatayim (IL); Alon Navon, Tel-Aviv (IL); Lev Pachmanov, Haifa (IL); Jonathan Katz, Silver Spring, MD (US)

(73) Assignee: PAYPAL, INC., San Jose, CA (US)

( * ) Notice: Subject to any disclaimer, the term of this patent is extended or adjusted under 35 U.S.C. 154(b) by 165 days.

(21) Appl. No.: 17/019,807

(22) Filed: Sep. 14, 2020

(65) Prior Publication Data

US 2022/0085989 A1 Mar. 17, 2022

(51) Int. Cl.
*H04L 9/08* (2006.01)
*H04L 9/32* (2006.01)

(52) U.S. Cl.
CPC ............ *H04L 9/0861* (2013.01); *H04L 9/085* (2013.01); *H04L 9/0825* (2013.01); *H04L 9/3247* (2013.01)

(58) Field of Classification Search
CPC ..... H04L 9/0861; H04L 9/0825; H04L 9/085; H04L 9/3247
See application file for complete search history.

(56) References Cited

U.S. PATENT DOCUMENTS

| 10,903,991 B1* | 1/2021 | Craige .................. H04L 9/3252 |
| 2010/0153746 A1* | 6/2010 | Takeuchi ............. H04L 9/3236 |
| | | 713/193 |
| 2015/0262139 A1 | 9/2015 | Shtylman |
| 2015/0262171 A1 | 9/2015 | Langschaedel et al. |
| 2017/0155628 A1* | 6/2017 | Rohloff ................... H04L 63/02 |
| 2018/0123804 A1* | 5/2018 | Smith ................. H04L 63/0869 |
| 2018/0205547 A1 | 7/2018 | Lindell |
| 2018/0357427 A1 | 12/2018 | Lindell et al. |

(Continued)

FOREIGN PATENT DOCUMENTS

| CA | 2949847 | 9/2015 |
| WO | 2017145010 A1 | 8/2017 |

OTHER PUBLICATIONS

Amgard et al., "A Generalization of Paillier's Public-Key System with Applications to Electronic Voting", International Journal of Information Security, Sep. 30, 2010, pp. 371-372.

(Continued)

*Primary Examiner* — Darshan I Dhruv
(74) *Attorney, Agent, or Firm* — Haynes and Boone, LLP

(57) ABSTRACT

A system and method for digitally signing data. A method includes generating, by a first device, at least one first secret share based on a secret key chosen by the first device, wherein the first device is offline with respect to a second device; partially signing data by the first device using the at least one secret share, wherein the data is received from the second device without establishing direct communications between the first device and the second device; and sending the partially signed data from the first device to the second device, wherein the second device generates signed data using the partially signed data, wherein the signed data corresponds to a public key generated based on the at least one first secret share and at least one second secret share generated by the second device.

20 Claims, 6 Drawing Sheets

(56) References Cited

U.S. PATENT DOCUMENTS

| | | | |
|---|---|---|---|
| 2018/0367316 A1* | 12/2018 | Cheng | H04L 9/3234 |
| 2019/0034919 A1 | 1/2019 | Nolan et al. | |
| 2019/0222414 A1 | 7/2019 | Pe'er et al. | |
| 2019/0245857 A1 | 8/2019 | Pe'er et al. | |
| 2019/0280857 A1 | 9/2019 | Mishli et al. | |
| 2020/0044863 A1 | 2/2020 | Yadlin et al. | |
| 2020/0145231 A1* | 5/2020 | Trevethan | H04L 9/3255 |
| 2020/0226332 A1* | 7/2020 | Patil | H04L 63/0823 |
| 2020/0266997 A1 | 8/2020 | Monica et al. | |
| 2020/0389306 A1* | 12/2020 | Dolan | H04L 9/3066 |
| 2022/0045867 A1* | 2/2022 | Beery | H04L 9/3252 |

OTHER PUBLICATIONS

Damgard et al., "A Length-Flexible Threshold Cryptosystem with Applications", BRICS: Basic Research in Computer Science, Mar. 16, 2003, pp. 1-31.

Feldman, Paul., "A Practical Scheme for Non-interactive Verifiable Secret Sharing", FOCS: Foundations of Computer Science, 1987, pp. 427-438.

Gennaro et al., "Threshold-optimal DSA/ECDSA Signatures and an Application to Bitcoin Wallet Security", 2016, pp. 1-42.

Hazay et al., "Efficient RSA Key Generation and Threshold Paillier in the Two-Party Setting", In Cryptographers Track at the RSA Conference, 2012, pp. 313-331.

Poupard et al., "Short Proofs of Knowledge for Factoring", In International Workshop on Public Key Cryptography, 2000, pp. 147-166.

Curv Launches Offline Signing Solution After Expanding Into Asia—cointelegraph (Retrieved on Nov. 14, 2021) Retrieved from the Internet < https://web.archive.org/web/20200429221001/https://cointelegraph.com/news/curv-launches-offline-signing-solution-after-expanding-into-asia> Cointelegraph Apr. 29, 2020 (Apr. 29, 2020).

Goldfeder et al. "Securing Bitcoin wallets via a new DSA/ECDSA threshold signature scheme", (Retrieved on Nov. 14, 2021) Retrieved from the Internet <http://stevengoldfeder.com/papers/threshold_sigs.pdf> Jun. 30, 2015 (Jun. 30, 2015).

* cited by examiner

TECHNIQUES FOR SINGLE ROUND MULTI-PARTY COMPUTATION FOR DIGITAL SIGNATURES

TECHNICAL FIELD

The present disclosure relates generally to cryptographic digital signatures, and more specifically to multi-party computation for cryptographic digital signatures.

BACKGROUND

In cryptography, digital signatures are typically realized using keys. A digital signature is a set of algorithms and protocols utilized to verify the authenticity of a message contents. Each entity's identity is determined by the public key of a private/public key-pair. Only the owner of the private key can sign a message. Digital signatures have seen increasing use as digital assets become an increasingly important part of modern life.

Digital currencies and other technologies utilizing blockchain technology are seeing increasing use and therefore face evolving needs. A blockchain is a continuously growing distributed electronic ledger including blocks of data. Copies of the blockchain are maintained by peer devices in a peer-to-peer network typically consisting of thousands of peers and utilized by potentially millions of users that participate in transactions. Because a copy of the entire blockchain is maintained by each peer, no single centralized system is needed to maintain the records.

Many blockchain uses involve digitally signing transaction data to be recorded on the blockchain. Accordingly, it has become increasingly important to ensure that digital signing techniques are secure. Further, as these uses become subject to regulation, the above mentioned needs for flexibility in implementation will become more important.

Some solutions involving offline devices exist. These solutions face challenges in flexibility. As an example for a typical digital currency implementation, "cold" wallets (i.e., wallets in which the private key is not accessible via the Internet or similar networks) are less susceptible to cyber breaches than "hot" wallets (i.e., wallets in which the private key is accessible via the Internet). However, since cold wallet private keys are not accessible via the Internet, the user must be able to physically access the system storing the private key in order to sign transactions prior to transmitting them to the blockchain. In the enterprise context, this also requires granting access to cold wallets to certain trusted employees. However, mismanagement of this access can result in losses.

With the increase in demand for digital signatures, there is also an increasing demand for flexibility in deployment of digital signing mechanisms. Aside from user preferences and needs, the various real-world landscapes in which digital signatures operate are evolving. Regulatory, licensing, reporting, and other requirements may change what is needed for digital signing mechanisms. For example, some countries have requirements in place for institutions working with digital assets that detail how online (e.g., assets for which the keys are accessible via the Internet) and offline (e.g., assets for which the keys are not accessible over the Internet) assets must be balanced.

Storing assets offline reduces the likelihood that assets are improperly accessed by external malicious entities such as hackers. However, offline systems are more difficult to control and to ensure that those systems are up-to-date. Therefore, when assets are kept offline, new operational risks are introduced.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for digitally signing data. The method comprises: generating, by a first device of a plurality of devices, at least one first secret share based on a secret key chosen by the first device, the plurality of devices including the first device and a second device, wherein the first device is offline at least with respect to the second device; partially signing data by the first device using the at least one secret share, wherein the data is received from the second device without establishing direct communications between the first device and the second device; and sending the partially signed data from the first device to the second device without establishing direct communications between the first device and the second device, wherein the second device generates signed data using the partially signed data, wherein the signed data corresponds to a public key, wherein the public key is generated based on a plurality of secret shares including the at least one first secret share and at least one second secret share, wherein the at least one second secret share is generated by the second device.

Certain embodiments disclosed herein also include a non-transitory computer readable medium having stored thereon causing a processing circuitry to execute a process, the process comprising: generating, by a first device of a plurality of devices, at least one first secret share based on a secret key chosen by the first device, the plurality of devices including the first device and a second device, wherein the first device is offline at least with respect to the second device; partially signing data by the first device using the at least one secret share, wherein the data is received from the second device without establishing direct communications between the first device and the second device; and sending the partially signed data from the first device to the second device without establishing direct communications between the first device and the second device, wherein the second device generates signed data using the partially signed data, wherein the signed data corresponds to a public key, wherein the public key is generated based on a plurality of secret shares including the at least one first secret share and at least one second secret share, wherein the at least one second secret share is generated by the second device.

Certain embodiments disclosed herein also include a system for digitally signing data. The system comprises: a processing circuitry; and a memory, the memory containing instructions that, when executed by the processing circuitry, configure the system to: generate at least one first secret share based on a secret key chosen by the system, wherein the system is a first device of a plurality of devices, the plurality of devices including the first device and a second device, wherein the first device is offline at least with respect to the second device; partially sign data using the at least one secret share, wherein the data is received from the second device without establishing direct communications between the first device and the second device; and send the partially signed data to the second device without establishing direct communications between the first device and the second device, wherein the second device generates signed data using the partially signed data, wherein the signed data corresponds to a public key, wherein the public key is generated based on a plurality of secret shares including the at least one first secret share and at least one second secret share, wherein the at least one second secret share is generated by the second device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
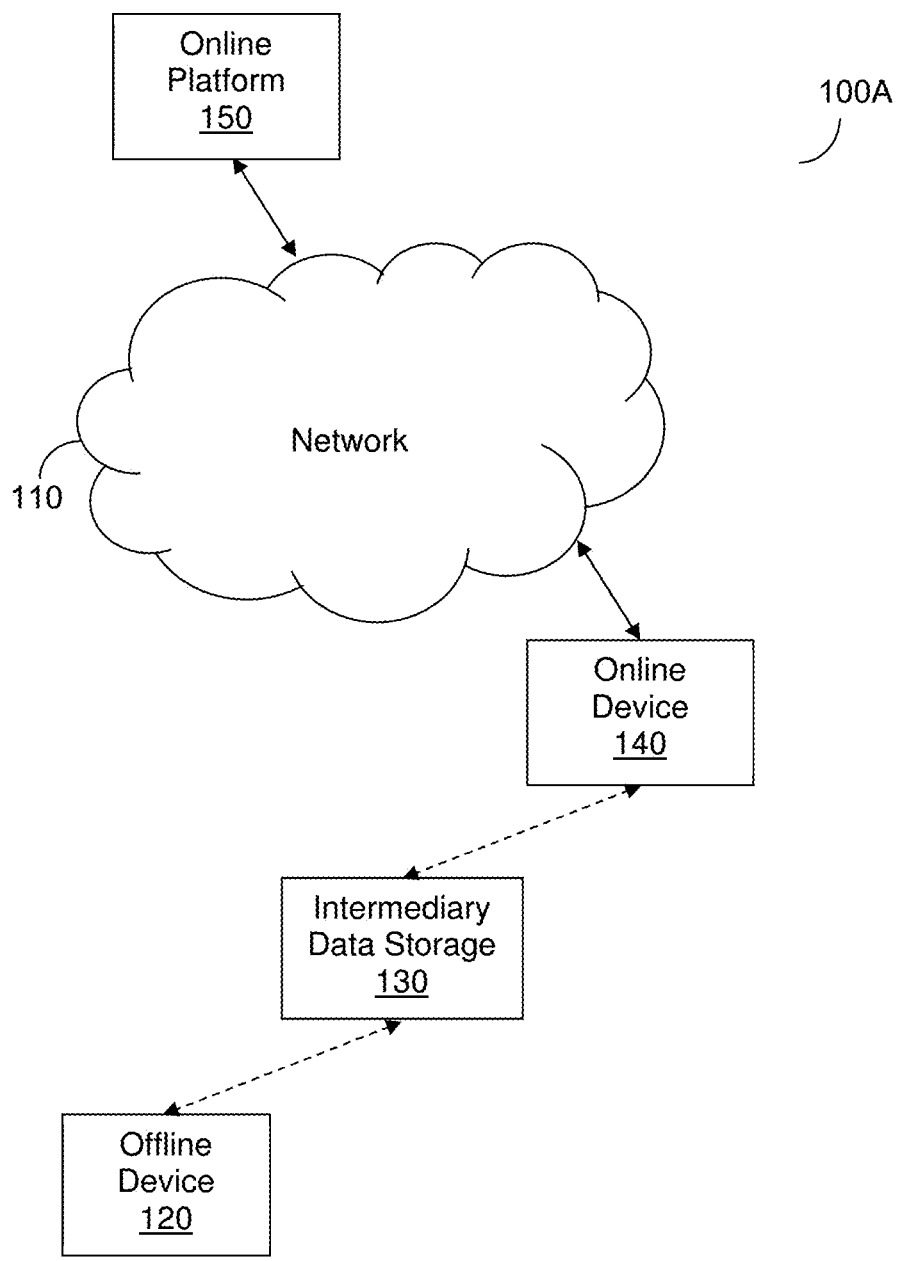
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for single round multi-party computation of digital signatures. More specifically, data is partially signed by an offline device during a single round of signing operations. One or more other devices each partially sign the data, thereby completing the signature and generating signed data which can be, for example, uploaded. Thus, the amount of interaction with the offline device involved in the signing process is minimized. Further, some of the disclosed embodiments can support use of stateless protocols by the offline device.

In an embodiment, the digital signing includes a key generation stage and a signing stage. During the key generation stage, parties to the digital signing interact to generate a new public key. During the signing stage, the parties interact in order to sign the data using their respective shares. In a further embodiment, the digital signing further includes a preprocessing stage. During the preprocessing stage, the parties interact to generate correlated data to be used in the signing stage (where one package of information is stored for each future sign operation). This preprocessing stage can be executed as many times as required.

In an embodiment, one or more of the parties to the data signing is an offline device which is offline with respect to one or more networks, i.e., the offline device not connected to the Internet or other network (e.g., an air-gapped device). More specifically, the offline device is offline at least with respect to networks accessible to at least some of the other participants in the shares generation and digital signing. The interactions with the offline device during the signing stage occur during a single round of interactions. In the single round of interactions, data is sent to the offline device by another participating device, calculations are performed on the offline device based on the sent data in order to partially sign the data, and the partially signed data from the offline device to the other participating device.

In accordance with the disclosed embodiments, a device is offline with respect to a network when the device is not connected, either directly or indirectly through other systems or devices, to that network. A first device is offline with respect to a second device when the first device and the second device are not communicatively connected through any network or combination of networks.

In an example implementation, the offline device is offline with respect to the Internet and with respect to any networks accessible to devices that are connected to the Internet. In another example implementation, multiple offline devices may be connected to each other, and each of the offline devices is offline with respect to other online devices. In yet another example implementation, all devices participating in the MPC may be offline with respect to the Internet, and at least some of the devices are offline with respect to each other.

In various embodiments, the disclosed embodiments may be applied to a keyless multi-party computation protocol such as, but not limited to, the protocol for securing digital signatures using multi-party digital signatures described in U.S. patent application Ser. No. 16/404,218, assigned to the common assignee, the contents of which are hereby incorporated by reference. Such embodiments have improved security as compared to key-based solutions while maximizing flexibility.

The disclosed embodiments provide benefits typically associated with use of "cold" wallets or otherwise digital assets whose keys are offline without at least some of the usual drawbacks of such approaches. Because the disclosed embodiments are compatible with multi-party computation approaches to digital signing, the disclosed embodiments can provide availability while minimizing exposure to security risks. More specifically, the disclosed single round protocol allows for digitally signing assets offline, thereby protecting digital assets from unauthorized access attempts. Further, assets may be signed on premises of a user, thereby removing any need to use a third party service for signing.

Further, the disclosed embodiments provide a multi-party computation protocol that minimizes the number of rounds needed to securely sign data. As noted above, implementations involving "cold" devices (i.e., devices storing keys which are not directly or indirectly accessible via the Internet) require manual interactions with the cold devices. This can be time-consuming and labor-intensive, which makes frequent involvement of cold devices undesirable. Accordingly, the disclosed embodiments mitigate this challenge by reducing the number of times in which an offline device needs to be involved in the multi-party computation.

FIG. 1A shows an example network diagram 100A utilized to describe the various disclosed embodiments. In the example network diagram 100A, an online device 140 communicates with an online platform 150 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the online device 140 and the offline device 120 may be, but is not limited to, a personal computer, a laptop, a tablet computer, a smartphone, a wearable computing device, or any other device capable of receiving and displaying notifications. The offline device 120 may be configured with any kind of software for participating in digital signatures such as, but not limited to, server side, client side, and the like. Data stored by the offline device 120 may be stored in a hardware security module (not shown), i.e., a storage module without a central processing unit.

In order to facilitate transfer to the offline device 120, in an example implementation, data to be signed is transferred from the online device 140 to an intermediary data storage (DS) device 130.

The intermediary data storage 130 stores information and allows for transferring data to or from the offline device 120. Thus, the intermediary data storage 130 is any data transfer mechanism that does not need to connect to the network 110 in order to transfer such data. The intermediary data storage device 130 may, but is not limited to, an external hard drive, a memory card, a quick response (QR) code, a universal serial bus (USB) key, a uniform resource locator (URL), a producer of a sound (e.g., a modem configured to make sounds), a one-way link (e.g., an optical, digital or analog one-way link), a printed paper and a camera, a scanner, combinations thereof, and the like. The intermediary data storage 130 is not otherwise communicatively connected to the network 110, and is only communicatively connected to the online device 140 when not in communication with the offline device 120. In some implementations, multiple intermediary data storages (not shown) may be utilized.

In various implementations, the intermediary data storage 130 is configured for one-way communication with a receiving device (i.e., a device to which data is transferred). As a non-limiting example, such one-way communication may be realized using a half-duplex system (not shown). Alternatively or connectively, the intermediary data storage 130 may be configured for bi-directional communication such as, but not limited to, using Bluetooth or other wireless technology standards. In particular, the intermediary data storage 130 may utilize one-way communication when communicating with an offline device.

In some implementations, all data being transferred from the online device 140 to the offline device 120 pursuant to the disclosed embodiments is partially signed or encrypted using a public key known to the offline device 120. To this end, in an embodiment, the offline device 120 is configured to attempt to decrypt or validate incoming communications using the public key. In another embodiment, incoming data transferred from the online device 140 can include a hash of the last message received from the offline device 120. To this end, the offline device 120 may be configured to check the hash in the incoming data against the hash of the most recent data transferred to the online device 140 in order to confirm that the incoming data is being received from the same device. Including hashes of previous messages allows for verifying that the messages are being received from the same sender and, therefore, secure. In particular, this may be performed when key generation involves multiple rounds of communication.

It should be noted that, in some embodiments, all devices participating in the signing protocol may be offline with respect to networks such as the Internet. In such an embodiment, the signed transaction data may be uploaded by transferring the signed transaction data from one of the offline devices to an online device, for example via an intermediary storage device.

Figure 1B:
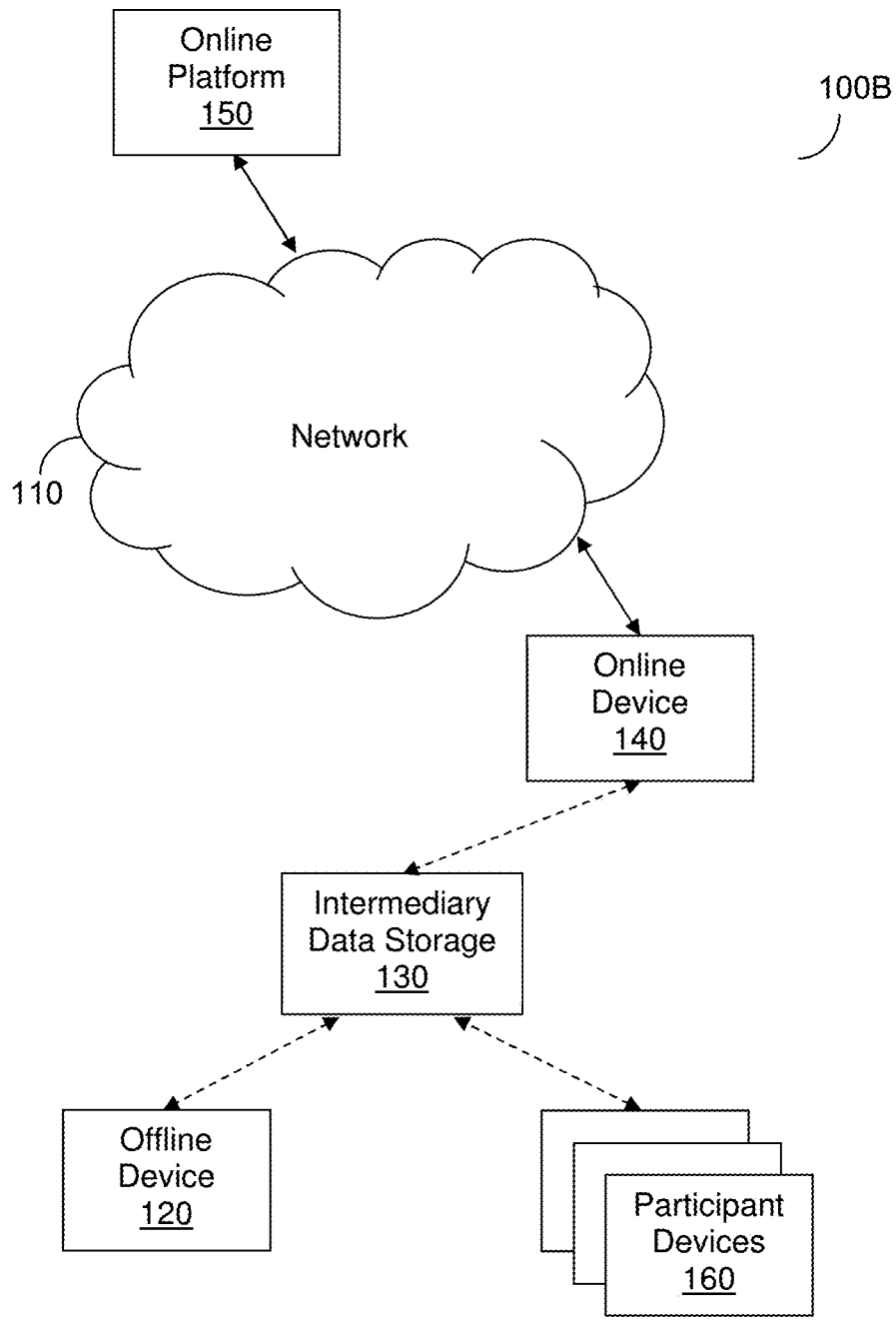

FIG. 1B show an example network diagram 100B that illustrates a potential network configuration that may be utilized with multiple offline devices. In the example network diagram 100B, the offline device 120 is offline with respect to one or more participant devices 160 and the online device 140 is configured to upload signed data to the online platform 150 but is not necessarily a participant in the signing.

The participant devices 160 are other participants in the signing. To this end, data is transferred between the offline device 120 and one or more of the participant devices 160 via the intermediary data storage 130. Any or all of the participant devices 160 may be offline with respect to the network 110.

It should be noted that a single intermediary data storage 130 is shown in FIG. 1B for simplicity, but in other implementations, data may be transferred between the offline device 120 and each participant device 160 using a different intermediary data storage, the participant devices 160 may transfer signed data to the online device 140 via a different intermediary data storage, or both.

It should also be noted that the arrangements of components depicted in FIGS. 1A-B are merely examples used for illustrative purposes, but that the disclosed embodiments may be equally applicable to other arrangements of components. For example, in some implementations, the offline device 120 may be connected to some networks (e.g., private local networks) but not others (e.g., the Internet). In particular, in accordance with the disclosed embodiments, the offline device 120 is not connected to any networks accessible to at least some of the other devices participating in the signing protocol. Thus, in some implementations, the device 120 does not need to be an air-gapped device.

In various disclosed embodiments, the offline device 120 is not directly or indirectly connected to the Internet or otherwise exposed to the network(s) accessible to the online device 140, but the disclosed embodiments are not necessarily limited to this implementation. Further, the offline device communicates with at least some of the other device(s) participating in the signing indirectly, i.e., without establishing direct communications or otherwise establishing a connection to those online devices. To this end, in various disclosed embodiments, data is transferred to and from the offline device is transmitted using one or more intermediary data storages.

Additionally, it should be noted that multiple online devices, multiple offline devices, or both, may be participants in the disclosed digital signing processes in accordance with the disclosed embodiments. Likewise, data may be transferred between the offline devices and the online devices via multiple intermediary data storages without departing from the scope of the disclosure. A single online device, a single offline device, and a single intermediary data storage are shown merely for simplicity purposes.

Figure 2:
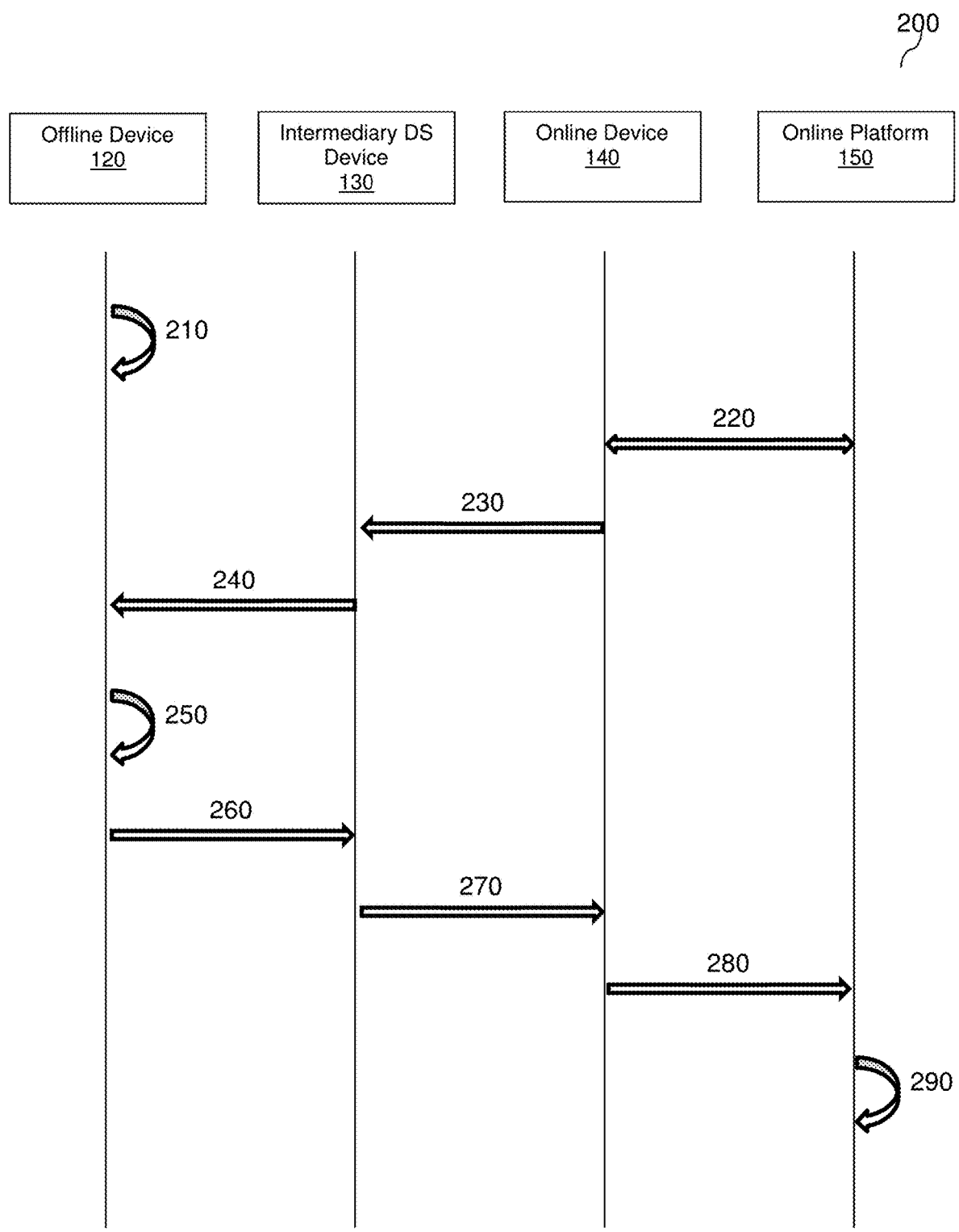
FIG. 2 is a sequence diagram illustrating a method for signing a transaction partially offline utilized in accordance with the disclosed embodiments.

The interactions between the components described above with respect to FIG. 1A are now further explained with respect to FIG. 2. FIG. 2 is a sequence diagram illustrating communications among the offline device 120, the intermediary data storage device 130, the online device 140, and the online platform 150.

At 210, the offline device 120 is configured to perform the relevant portion of the disclosed embodiments. In particular, the offline device 120 is configured such that it can participate in secret generation (e.g., keys, shares, or both) and the single round of digital signing described herein. In an example implementation, the configuration at 210 may include installing software on the offline device 120.

At 220, a process requiring a digital signature is initiated between the online device 140 and the online platform 150. As a non-limiting example, the process may be a transaction such as a transaction to be added to a blockchain and the data may be transaction data. It is checked if the data meets one or more signing policies. The process may further require determining whether the signature meets one or more signing policies.

At 230, when the data meets all applicable signing policies, the data is transferred to the intermediary data storage device 130. At 240, the data is transferred from the intermediary data storage device 130 to the offline device 120. At 250, the data is validated and partially signed on the offline device 120. At 260, the partially signed data is transferred to the intermediary data storage device 130.

At 270, the partially signed data is transferred from the intermediary data storage device 130 to the online device 140. At 280, the partially signed data is uploaded to the online platform 150 by the online device 140. At 290, the partially signed data is stored, recorded, or otherwise finalized via the online platform 150. In some embodiments, 290 includes adding the partially signed data to a decentralized ledger such as a blockchain (not shown).

It should be noted that FIG. 2 is merely an example, and that communications among devices are not limited to the specific communications shown in FIG. 2. As noted above, the disclosed signing process may be among all offline devices (e.g., all devices that are offline with respect to the Internet or other networks). In these and other implementations, the device which initiates the process requiring the digital signature may not actually participate in the signing process, and may instead simply be a conduit for uploading signed data.

Figure 3:
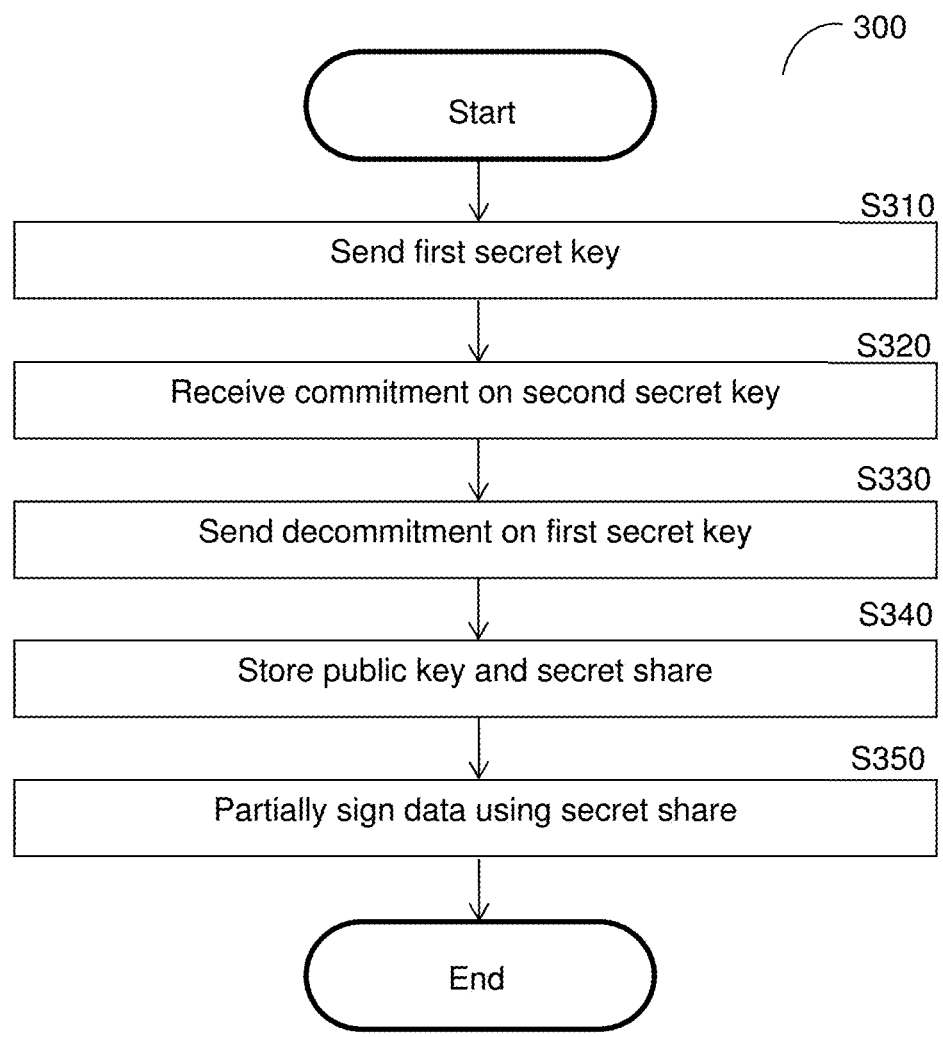
FIG. 3 is a flowchart illustrating a method for signing data using a single round multi-party computation protocol according to an embodiment.

FIG. 3 is an example flowchart 300 illustrating a method for signing data using a single round multi-party computation protocol according to an embodiment. In an embodiment, the method is performed by a device participating in signing such as the offline device 120, the online device 140, or one of the participant devices 160, FIGS. 1A-B.

At S310, a first device secret key $sk_A$ is chosen. In an embodiment, S310 may further include sending a commitment on a value $sk_A \cdot G$ calculated based on the first device secret key $sk_A$, a non-interactive zero-knowledge proof of knowledge (NIZKPoK) of the first device secret key $sk_A$, or both, to the other participants in the signing. Each of the other participants chooses a secret key. In an embodiment, the secret keys chosen by the participants are all chosen from among the same set.

A unique "session ID" for the shares generation is chosen by the parties to the signing. The session ID may be represented as a function of random strings chosen by participant devices participating in the signing. When a random oracle is needed by any of the participants during the shares generation, the random oracle may be instantiated using a function such as, but not limited to, a HMAC function. The function used for instantiating the random oracle may be instantiated based on the session ID and a string that is unique to the protocol being used.

In an embodiment, at least one participant in the signing is offline with respect to other participants in the signing. As a non-limiting example, such a participant may be the offline device 120, FIGS. 1A-B. The offline device 120 is offline with respect to other participants in the signing such that the offline device 120 cannot communicate with the other participants in the signing via one or more networks such as, but not limited to, the Internet. To this end, in an embodiment, the commitment is sent via, for example, one or more intermediary storage devices.

At S320, a commitment on a value calculated based on a second secret key $sk_B$ chosen by another participant in the signing as well as a NIZKPoK on the second secret key $sk_B$ are received from the other participant in the data signing. As a non-limiting example, such a NIZKPoK may be created using the Fiat-Shamir heuristic. The participants interact to setup a secure multiplication protocol, for example, based on oblivious transfer or homomorphic encryption. In an embodiment, the commitment is received via, for example, one or more intermediary storage devices.

At S330, a recommitment on the value calculated based on the first secret key $sk_A$ as well as a NIZKPoK of the first secret key $sk_A$ are sent to the other participant in the data signing. The other participant stores the result of the secure multiplication protocol setup. In an embodiment, the recommitment and the NIZKPoK sent via, for example, one or more intermediary storage devices.

At S340, a public key and a secret share are stored. The public key is the same as a public key generated by other participants in the data signing and can be calculated as, for example, $sk_A \cdot sk_B \cdot G$ or $(sk_A + sk_B) \cdot G$. The secret share includes the offline device secret key $sk_A$ and a secret output of the secure multiplication protocol setup.

Each public key is generated by one of the parties based on the party's respective secret shares such that data that is partially signed using the secret shares corresponding to the public key. Due to this correspondence, the secrets shares have the property that the secret shares could be validated using the public key if the secret shares were to be assembled by a single system (which is not possible in accordance with various disclosed embodiments since the shares are not revealed among systems).

At S350, data is partially signed using the secret share generated at S340. In an embodiment, the signing may follow the process described further below with respect to FIG. 4. The data is partially signed in that the offline device(s) provide a portion of the whole signature, where the whole signature includes portions of signatures corresponding to the respective secret shares of the parties participating in the signing.

In another embodiment, the signature protocol may further allow for supporting a deterministic key derivation process such as BIP32 non-hardened derivation. To this end, in such an embodiment, the signature generated by each party to the digital signing is generated based further on a value δ determined via the deterministic key generator, where the value δ is known to all parties. In some implementations, S350 may include checking the resulting signature with a derived public key that is a predetermined function of the original public key in order to verify that the public key was generated using data from one or more offline devices in accordance with the disclosed embodiments. Any or all other parties to the signing may perform similar checks to independently verify the public key. The derived public key may be calculated, for example, as sk A·sk B·G+δ·G or (sk A·sk B)·G+δ·G, where δ is defined according to the BIP32 standard.

It should also be noted that, in an embodiment, secret shares may be rotated in a way that is consistent with the public key. Such rotation may be performed between any two or more parties that wish to refresh their secret shares. The rotation includes creating, by each of the parties rotating shares, new shares that collectively form the same private key as the previous shares created by the party and may include, but is not limited to, generating derived shares or independently generating new shares.

It should also be noted that the steps of FIG. 3 are depicted as a single process merely for simplicity purposes, but that at least some steps may be performed remotely in time from other steps. In particular, the data signing at S350 may occur at a remote time from the other steps S310 through S340.

Additionally, in some implementations, at least some of the steps of FIG. 3 may be performed multiple times in series or in parallel. For example, when there are multiple other participants in the digital signing, the steps for determining keys and secret shares may be performed multiple times, and multiple secret shares may be determined. In this regard, it should also be noted that each party generates its respective secret shares and that none of the parties knows the entire set of shares that will be used to sign the data. As a non-limiting example, if a customer SDK and a MPC service provider system will store the shares, at least two shares are created. As another non-limiting example, if four systems will store the shares, at least four shares are created. The system of each party creates one or more of the shares separately and independently from the other systems.

Figure 4:
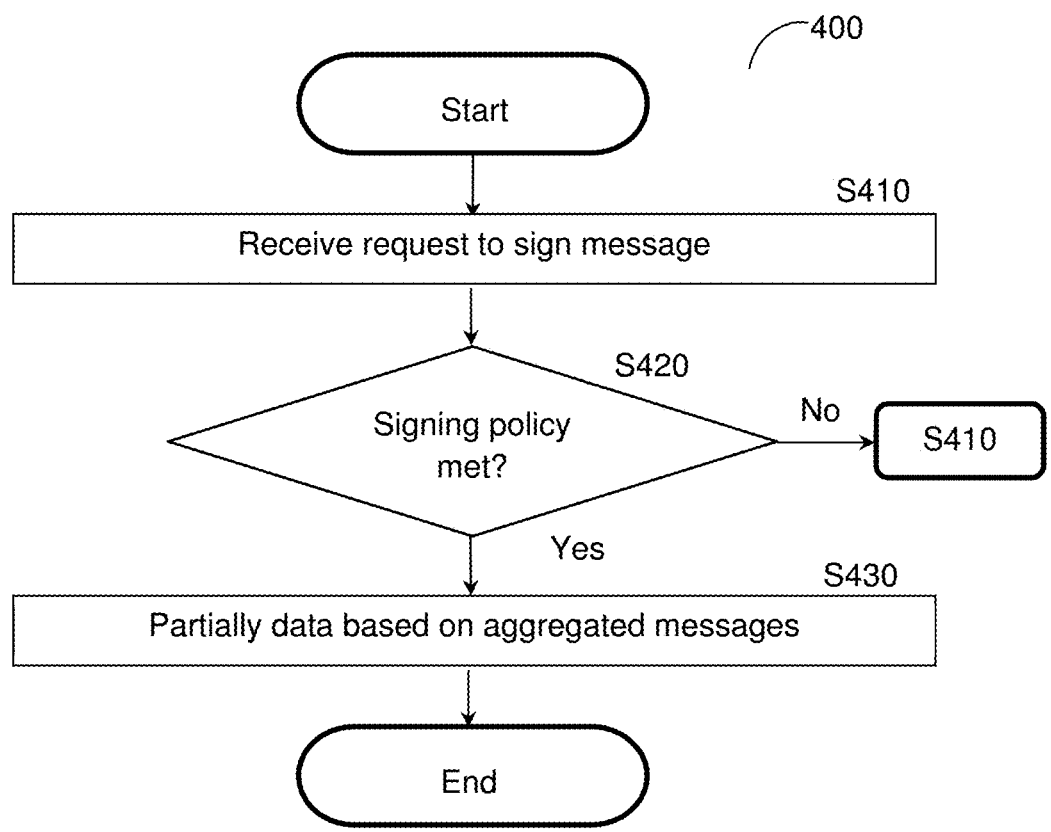
FIG. 4 is a flowchart illustrating a method for securing digital signatures via multi-party computation according to an embodiment.

FIG. 4 is an example flowchart 400 illustrating a method for securing digital signatures via MPC according to an embodiment. In an embodiment, one of the systems participating in and performing the method of FIG. 4 is the offline device 120.

At S410, a request for a signature on a message is received. The request may be received from, for example, a user device. The request at least includes data to be signed (for example, Bitcoin transaction data).

At S420, it is determined whether requirements of a signing policy have been met and, if so, execution continues with S430; otherwise, execution either terminates (not shown) or continues with S410 (shown). The signing policy includes rules for validating the authenticity and, if the signature is approved, the system of the validating party (for example, a service provider) will use its respective shares in order to sign a transaction. The signing policy may further include additional requirements as described herein above. To this end, S440 may include communicating with other systems to, for example, prompt other users to provide authentication and approval for the transaction.

At S430, secret shares are used to sign the data. In an embodiment, the secret shares are created as described above with respect to FIG. 3.

The signing includes running a MPC protocol using the shares as part of an interactive signing process. The interactive signing process includes each system running a MPC protocol using its respective shares. In an embodiment, the data is partially signed by each system using a distributed implementation of a digital signature algorithm (for example, ECDSA/EdDSA/Schnorr), such that the full private key is never reconstructed on any system. In a further embodiment, during the signing, no portion of each system's shares is revealed to the other system. As non-limiting examples, such a digital signature algorithm may be ECDSA, Edwards-curve Digital Signature Algorithm (EdDSA), Schnorr, and the like. The security of the protocol may be proven based on cryptographic assumptions (e.g., a discrete log). To this end, the digital signature algorithm may utilize an additive homomorphic encryption scheme and efficient zero knowledge proofs for proving statements about elements from different finite groups without conveying other information about the elements.

In another embodiment, S430 further includes performing a key derivation as part of the signature step without deriving the actual keys separately. In that case, the parties may sign a message with shares of a derived key directly using the shares of the original key.

In an embodiment, one or more of the systems participating in the signing are offline at least with respect to the other systems (i.e., not connected to a network or, more specifically, not connected to the network(s) used by the other systems) and only one round of interaction will be required during part of the signing including the offline systems. It should be noted that a share may be stored offline even if the system storing the share is online. For example, a share may be stored locally on the system in a location that is not accessible over networks such that the share is not accessible over a network.

To this end, in a further embodiment, S430 includes receiving a message including data needed by the offline device for signing, signing the data using the offline device secret shares, and sending the message to one of the other participants for completion of the signature (e.g., by adding further signatures of other parties, uploading of the signed data to an online platform, both, and the like). This signing by the offline device is performed in a single round, i.e., one message transferred to the offline device and one message transferred from the offline device. As mentioned above, transfers of data to and from the offline device may be accomplished via use of intermediary data storages.

Performing the partial signing in a single round with one or more offline parties allows for minimizing interactions by the offline devices, minimizing exposure of the offline shares, or both. Further, by utilizing intermediary storage devices for communications with the offline devices, data needed for the interactive signing process can be transferred without exposing the offline devices to the same network as the other devices.

In some embodiments, one of the systems is offline except during a small number of rounds of interaction (e.g., below a predetermined threshold). In those rounds of interaction, the offline system receives aggregated messages from the other systems. Each aggregated message includes information used for the distributed implementation of the digital signature algorithm provided by all of the other systems. The result of the interactive rounds may be used for multiple signing operations, each requiring only a single round of interaction with the offline device. In other words, by sending aggregated messages containing all of the information required by the offline system, the offline system may participate in signing without requiring multiple rounds of interaction. As noted above, such rounds of interaction are particularly cumbersome when dealing with an offline device, as data must be transferred indirectly (e.g., through an intermediary data storage).

The disclosed embodiments may also be utilized to provide such a verified encrypted backup. To this end, in an embodiment, each party encrypts its secret share using a public key encryption scheme (e.g., RSA) and proves with a zero-knowledge proof that it encrypted the right value. As a non-limiting example, the parties may use additive shares to generate the signature keys as following: party i chooses a number xi and publishes xiG, where G is a generator in the elliptic curve used for the digital signature. Note that x is hidden given xG based on the security of the digital signature in use. The public key of the digital signature will be x1G+x2G+ . . . =(x1+x2+ . . . )G. In addition, party i encrypts xi under the public key of the backup encryption and proves with a zero-knowledge proof that the same xi is used in xiG and the encrypted backup.

It should be noted that, in an embodiment, no portion of any of the shares is revealed to any system outside of the system that generated those shares at any time. In other words, each system maintains its own shares, and shares are not provided or otherwise revealed to the other participating systems or other external systems. Since shares are not revealed to other systems, the latent private key cannot be reconstructed and used to fraudulently sign transactions.

It should be noted that the method may be repeated with the same keys because the same keys can be used for signing multiple messages.

Figure 5:
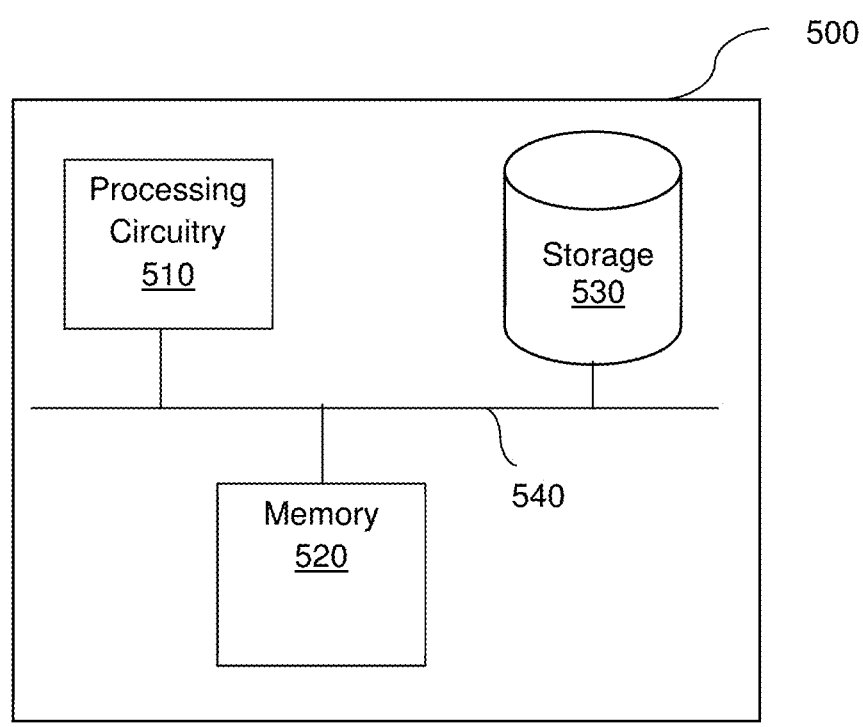
FIG. 5 is a schematic diagram of a participant device according to an embodiment.

FIG. 5 is an example schematic diagram of a participant device 500 according to an embodiment. The participant device 500 includes a processing circuitry 510 coupled to a memory 520, and a storage 530. In an embodiment, the components of the participant device 500 may be communicatively connected via a bus 540. The offline device 120 of FIG. 1, the online device 140 of FIG. 1, or both, may be configured as the participant device 500 in accordance with the disclosed embodiments.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

It should be understood that the embodiments described herein are not limited to the specific architecture illustrated in FIG. 5, and other architectures may be equally used without departing from the scope of the disclosed embodiments. In particular, the offline device 120 shown in FIG. 5 is an air-gapped device lacking any network interface. However, in some implementations, the offline device 120 may include a network interface.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for digitally signing data, comprising:
generating, by a first device of a plurality of devices, at least one first secret share based on a secret key chosen by the first device, the plurality of devices including the first device and a second device, wherein the first device is offline at least with respect to the second device;

partially signing data by the first device using the at least one first secret share, wherein the data is received from the second device via first intermediary data storage device without routing the data through a network server; and sending the partially signed data from the first device to the second device via a second intermediary data storage device without routing the partially signed data through the network server, wherein the second intermediary data storage device is different from the first intermediary data storage device, wherein signed data is generated using the partially signed data, wherein the signed data corresponds to a public key, and wherein the public key is generated based on a plurality of secret shares including the at least one first secret share and at least one second secret share.

2. The method of claim 1, wherein the data is partially signed by the first device in a single round of interactions with other devices of the plurality of devices.

3. The method of claim 1, wherein no portion of the at least one first secret share is revealed to the second device due to a partial signing of the data by the first device, wherein no portion of the at least one second secret share is revealed to the first device due to a generation of the signed data by the second device.

4. The method of claim 1, wherein the at least one second secret share is generated based on a secret key chosen by the second device.

5. The method of claim 1, wherein the data is partially signed using a digital signature, and wherein the method further comprises:

generating the digital signature based on the data, the at least one first secret share, and a value determined via a deterministic key derivation process, wherein the value determined via the deterministic key derivation process is known to each of the plurality of devices.

6. The method of claim 1, wherein the first device is an air-gapped device lacking a network interface.

7. The method of claim 1, further comprising:

storing the at least one first secret share in a hardware security module.

8. The method of claim 1, wherein the first intermediary data storage device or the second intermediary data storage device comprises: an external hard drive, a memory card, or a universal serial bus key.

9. A non-transitory computer readable medium having stored thereon machine-readable instructions that are executable to cause a machine to perform operations comprising:

generating at least one first secret share based on a secret key chosen by a first device of a plurality of devices, the plurality of devices including the first device and a second device, wherein the first device lacks a capability to communicate directly with the second device;

partially signing, by the first device using the at least one first secret share, data received from the second device through a first portable data storage device, wherein the data is routed from the second device to the first device without going through a network server; and sending the partially signed data from the first device to the second device via a second portable data storage device that is different from the first portable data storage device, wherein the partially signed data is routed from the first device to the second device via the second portable data storage device without going through a network server, wherein signed data is generated using the partially signed data, wherein the signed data corresponds to a public key, and wherein the public key is generated based on a plurality of secret shares including the at least one first secret share and at least one second secret share.

10. A system for digitally signing data, comprising:
processing circuitry; and
a non-transitory computer-readable medium having stored thereon instructions that, when executed by the processing circuitry, cause the system to perform operations comprising:

generating at least one first secret share based on a secret key chosen by the system, wherein the system comprises a first device of a plurality of devices, the plurality of devices including the first device and a second device, wherein the first device is offline at least with respect to the second device;

receiving, via a first intermediary data storage device, data from the second device, wherein the data is received from the second device without routing the data through a network server;

partially signing the data using the at least one first secret share; and sending, via a second intermediate data storage device that is different from the first intermediary data storage device, the partially signed data to the second device, wherein the partially signed data is sent to the second device without routing the partially signed data through the network server, wherein signed data is generated using the partially signed data, wherein the signed data corresponds to a public key, and wherein the public key is generated based on a plurality of secret shares including the at least one first secret share and at least one second secret share.

11. The system of claim 10, wherein the data is partially signed by the first device in a single round of interactions with other devices of the plurality of devices.

12. The system of claim 10, wherein no portion of the at least one first secret share is revealed to the second device due to a partial signing of the data by the first device, wherein no portion of the at least one second secret share is revealed to the first device due to a generation of the signed data.

13. The system of claim 10, wherein the at least one second secret share is generated by the second device based on a secret key chosen by the second device.

14. The system of claim 10, wherein the data is partially signed using a digital signature, wherein the operations further comprise:

generating the digital signature based on the data, the at least one first secret share, and a value determined via a deterministic key derivation process, wherein the value determined via the deterministic key derivation process is known to each of the plurality of devices.

15. The system of claim 10, wherein the first device is an air-gapped device lacking a network interface.

16. The system of claim 10, wherein the operations further comprise:

storing the at least one first secret share in a hardware security module.

17. The system of claim 10, wherein first intermediary data storage device or the second intermediary data storage device comprises: an external hard drive, a memory card, or a universal serial bus key.

18. The non-transitory computer readable medium of claim 9, wherein:
a partial signing of the data by the first device does not reveal the at least one first secret share to the second device; and
a generation of the signed data does not reveal the at least one second secret share to the first device.

19. The non-transitory computer readable medium of claim 9, wherein the first portable data storage device or the second portable data storage device comprises: an external hard drive, a memory card, or a universal serial bus key.

20. The non-transitory computer readable medium of claim 9, wherein no portion of the at least one first secret share is revealed to the second device due to a partial signing of the data by the first device, wherein no portion of the at least one second secret share is revealed to the first device due to a generation of the signed data.

* * * * *